United States Patent [19]
Bott

[11] 3,799,603

[45] Mar. 26, 1974

[54] AUTOMOBILE WIND DEFLECTOR ASSEMBLY

[76] Inventor: John A. Bott, 931 Lake Shore Dr., Grosse Pointe Shores, Mich. 48236

[22] Filed: Aug. 28, 1972

[21] Appl. No.: 284,285

[52] U.S. Cl. .................................. 296/1 S, 296/91
[51] Int. Cl. ............................................. B62d 35/00
[58] Field of Search .............. 296/1 S, 91; 248/225; 287/189.36 D

[56] References Cited
UNITED STATES PATENTS
3,596,975  8/1971  Stephen ............................. 296/1 S
3,258,250  6/1966  McMullin ...................... 248/225 X
3,008,756  11/1961  Lindhardt ............................ 296/91

Primary Examiner—David Schonberg
Assistant Examiner—John A. Pekar
Attorney, Agent, or Firm—Harness, Dickey & Pierce

[57] ABSTRACT

An automobile wind deflector assembly incorporating an extruded aluminum blade. The blade is mounted on an automobile body by a pair of brackets. The brackets are provided with flanges fitted within slots on the inner side of the blade. The arrangement eliminates the necessity of using screws exposed to the outer surface of the blade for connecting the blade to its supports.

5 Claims, 5 Drawing Figures

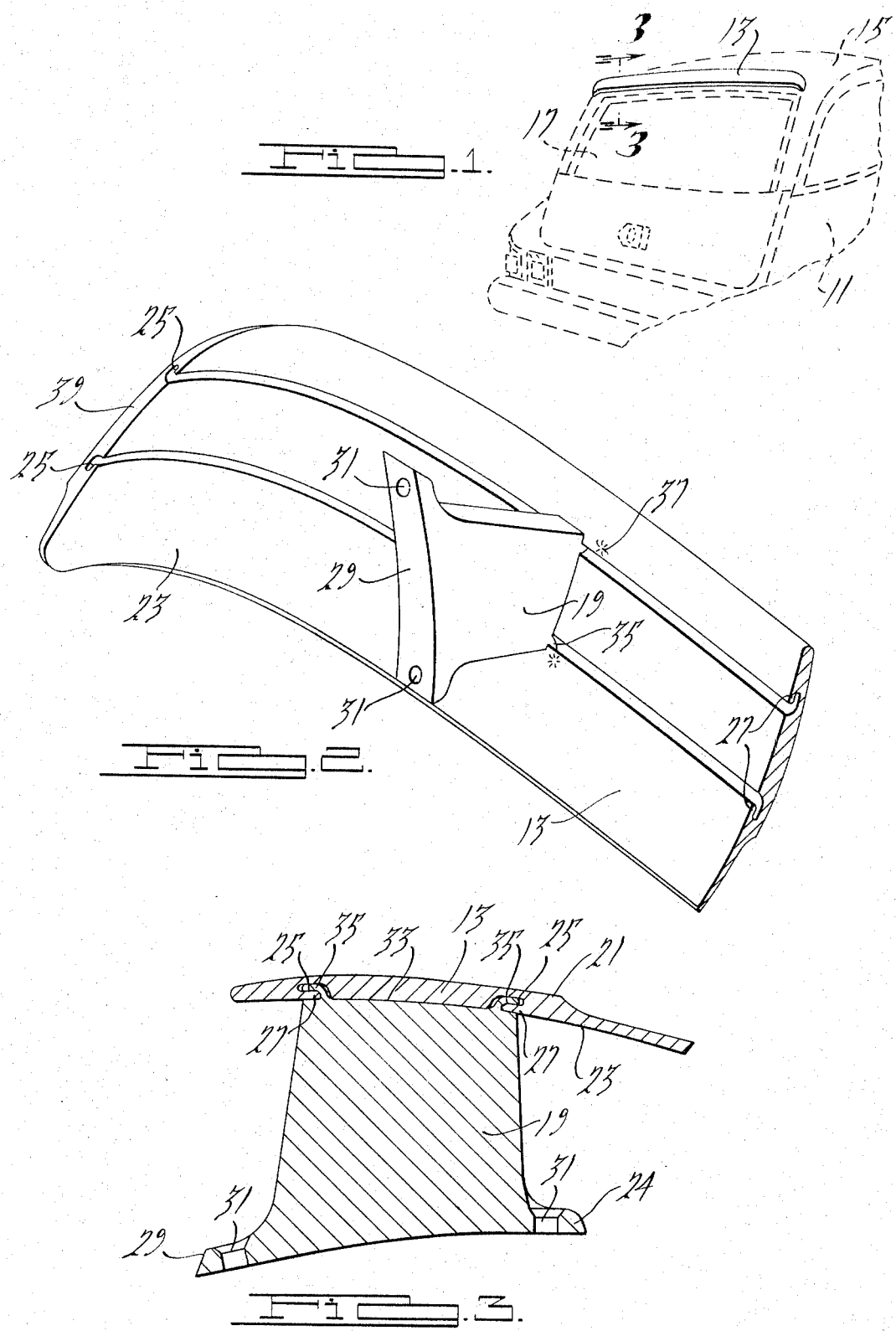

3,799,603

AUTOMOBILE WIND DEFLECTOR ASSEMBLY

SUMMARY OF THE INVENTION

Automobile wind deflectors have customarily employed an air deflecting blade mounted on the automobile body by a pair of brackets or supports. The connection between the blade and its supports has heretofore involved the use of simple screws passing through holes in the blade and threaded into a tapped hole in the support. The heads of the screws are accessible from the outer surface of the blade and their heads are clearly visible. From the automobile styling standpoint this method of attachment of the support to the blade has a number of drawbacks. The fastener head interrupts the smooth contour of the outer surface of the blade and presents an undesirable interruption in the blade surface. Furthermore, it is difficult to obtain a fastener which will properly match in color or texture the outer surface of the blade, particularly if the blade is to be painted to match the automobile body color. A screwdriver or other fastener driving tool will damage any paint which is applied to the fastener head. This necessitates touching up the fastener head after the blade is installed on its support, a procedure which automobile dealers and other users find to be highly undesirable.

Accordingly, it is an object of the present invention to provide an automobile wind deflector assembly in which the connection between the wind deflector blade and its support is made entirely on the inner surface of the blade and in which the outer surface of the blade is uninterrupted by fasteners or fastener receiving openings. The construction of the present invention is embodied in a wind deflector assembly in which the deflector blade is provided with parallel continuous slots on its inner surface to receive flanges provided on the supports, with an interference or friction fit being provided between the support flange and the wall of the slot to prevent movement of the blade longitudinally of its slots.

BRIEF DESCRIPTION OF THE DRAWINGS

FIG. 1 is a perspective view of a fragmentarily illustrated automobile having mounted thereon a wind deflector assembly made in accordance with the present invention;

FIG. 2 is an enlarged fragmentary perpective view of the wind deflector assembly of FIG. 1, the wind deflector assembly being removed from the automobile and the view being taken from the inner side of the blade;

FIG. 3 is an enlarged sectional view of the structure illustrated in FIG. 1 taken along the line 3—3 thereof;

DETAILED DESCRIPTION OF THE PREFERRED EMBODIMENTS

Figure 4:
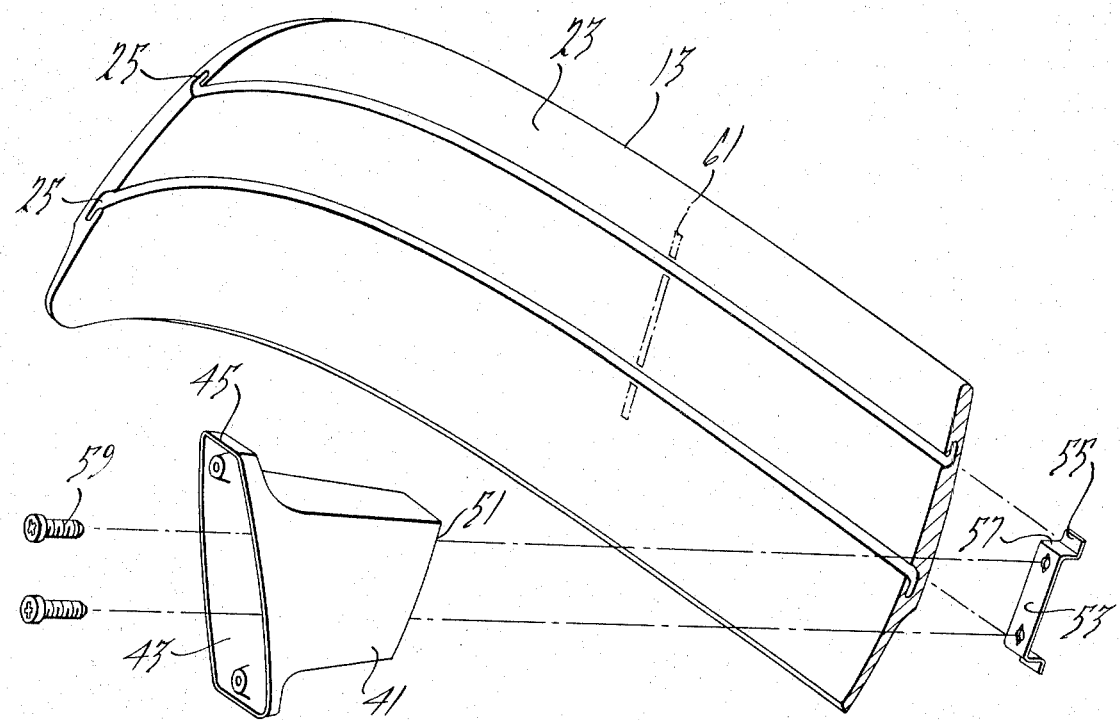
FIG. 4 is a fragmentary exploded perspective view of a modified form of wind deflector assembly embodying the principles of the present invention.

Referring now to FIG. 1, an automobile body 11 will be seen to have mounted thereon a wind deflector assembly including a wind deflector blade 13. The deflector is mounted on the automobile adjacent the rear of the automobile roof 15 and immediately above the rear window 17. The blade 13 is spaced outwardly from the outer surface of the body 11 by means of a pair of supports or brackets 19.

The blade 13 is desirably extruded from aluminum or other non-ferrous material and is of substantially uniform cross sectional shape. The blade may be die formed to give it a slight longitudinal bow or curvature. The blade 13 has a sculptured or contoured outer surface 21 and the inner surface 23 has a pair of spaced parallel slots 25 extending longitudinally of the blade. The blade 13 has a pair of walls 27 which overlie a major portion of each slot 25 leaving the slot open to the inner surface 23 only along the adjacent edges thereof.

Each support 19 will be seen to be formed with a base 29 having screw receiving openings 31 extending therethrough. An upper surface 33 of each support member 19 conformably engages the inner surface 23 of the blade 13 in the area between the slots 25. The upper support surface 33 is also provided with a pair of raised flanges 35 which conformably fit in the slots 25. The flanges 35 are inserted in the slots 25 from the opposite ends 37 of the blade 13. Once the supports 19 are properly positioned on the blade 13, the inner surface 23 is struck to define pairs of indentations 37 in the walls 27. Thus, once the supports 19 are screwed to the automobile body 11, longitudinal movement of the blade 13 will be prevented by abutment of the indentations 37 with the flanges 35. It will, of course, be apparent that the indentations 37 could be formed on the outer sides of the two supports 19. Also, if desired, indentations 37 can be formed on both sides of each support. In any case, inward deformation of the wall 27 adjacent the supports 19 provides an interference between the flange 35 and the slot 25 to resist relative movement between the blade 13 and the supports 19 in a direction parallel to the slots 25. The indentations 37 are, of course, formed before the installation of the entire wind deflector assembly on the vehicle.

Figure 5:
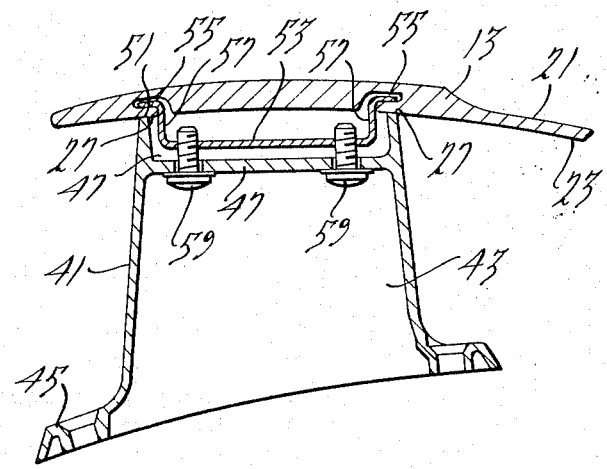
FIG. 5 is a transverse sectional view of the structure illustrated in FIG. 1.

A somewhat modified form of the invention is illustrated in FIGS. 4 and 5. This form of the invention utilizes the same blade 13 with a somewhat different pair of supports 41 which are preferably die cast to provide a hollow cavity or core 43. As in the prior embodiment of the invention, each support 41 has an apertured base portion 45 adapted to be fastened directly to the automobile body 11. A transverse wall 47 closes the upper end of the cavity 43 and defines the lower limits of a recess 49 at the top of the support 41. The upper end of each support 41 is defined by an annular upper end wall 51 engaging the inner surface 23 of the blade 13. A separate retainer clip 53 is provided on the upper end of each support 41 and has a pair of flanges 55 adapted to be slid into the slots 25 from the ends of the blade 13. The flanges 55 are formed on the ends of arms 57 extending upwardly from the opposite ends of the retainer clip 53. A pair of screws 59 extend through openings in the wall 47 and are threaded into the retainer clip 53. When the screws 59 are tightened the flanges 55 are drawn against the inner sides of the walls 27 to clamp the walls 27 between the annular end surface 51 and the flanges 55. Locating lines 61 are formed on the inner surface 23 of the blade 13 to assist in properly locating the supports 41 on the blade before the screws 59 are tightened. After the screws 59 are tightened and the supports 41 are thus locked to the blade 13, the entire wind deflector assembly is then mounted on the automobile body 11 by means of screws (not shown) fitted through the base portion 45 of each support 41.

It will thus be apparent that in both forms of the present invention the outer surface 21 of the blade 13 is unimpaired by fasteners and may be painted, covered with a decal, buffed or finished in any desired manner without any undesired consequences resulting from the fastening of the blade to its supports.

What is claimed is:

1. An automobile wind deflector assembly including an extruded wind deflecting blade having a pair of extruded parallel slots spaced from its top and bottom edges and extending the entire length thereof; each of said slots being open to the inner surface of said blade, being closed at its upper and lower sides and having a wall which partially closes the slot and extends along one of said top and bottom sides; a pair of supporting brackets operable to mount the blade on an automobile body, each of said brackets having end surface means engageable with the outer sides of said walls; and a pair of flanges carried by each of said brackets and insertable into said slots from one end thereof, each of said pair of flanges cooperating with the end surface means of their respective brackets to frictionally clamp said slot walls therebetween and thereby secure said blade to said brackets.

2. The structure set forth in claim 1 in which each of said pair of flanges is formed by a separate metal clip secured to each of said brackets.

3. The structure set forth in claim 2 in which each of said brackets are formed with a recess at the end thereof adjacent said blade and in which said metal clips are positioned in said recesses.

4. The structure set forth in claim 2 in which said metal clips are secured to said brackets by screws threaded into said clips from the side thereof opposite from said blade.

5. The structure set forth in claim 2 in which each of said brackets is of generally hollow configuration and has a wall extending across the interior thereof to define a hollow cavity on one side thereof and a recess on the opposite side thereof adjacent said blade, said metal clips being positioned in the recesses of said brackets and fasteners extending through said bracket walls to secure said clips to said brackets.

* * * * *